United States Patent
Kamarshi et al.

(10) Patent No.: US 9,304,582 B1
(45) Date of Patent: Apr. 5, 2016

(54) OBJECT-BASED COLOR DETECTION AND CORRECTION

(71) Applicant: Rawles LLC, Wilmington, DE (US)

(72) Inventors: Vijay Kamarshi, Cupertino, CA (US); Helder Jesus Ramalho, Saratoga, CA (US); Rahul Agrawal, Santa Clara, CA (US); Robert Ramsey Flenniken, Burlingame, CA (US); Ning Yao, San Jose, CA (US); Paul Matthew Bombach, Mountain View, CA (US); Yue Liu, Milpitas, CA (US); Sowmya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 14/134,721

(22) Filed: Dec. 19, 2013

(51) Int. Cl.
  *G06F 3/01* (2006.01)
  *G06F 3/042* (2006.01)
  *G06T 7/00* (2006.01)

(52) U.S. Cl.
  CPC .............. *G06F 3/011* (2013.01); *G06F 3/0425* (2013.01); *G06T 7/004* (2013.01)

(58) Field of Classification Search
  CPC ................................ G06F 3/011; G06F 3/0425
  See application file for complete search history.

(56) References Cited

U.S. PATENT DOCUMENTS

| | | | |
|---|---|---|---|
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2003/0164927 | A1* | 9/2003 | Tsukada ........................ 353/31 |
| 2009/0244309 | A1* | 10/2009 | Maison et al. ............. 348/222.1 |
| 2010/0188585 | A1* | 7/2010 | Ichieda ........................ 348/708 |
| 2012/0223885 | A1 | 9/2012 | Perez |
| 2013/0343601 | A1* | 12/2013 | Jia et al. ........................ 382/103 |
| 2014/0285522 | A1* | 9/2014 | Kim et al. ..................... 345/633 |
| 2015/0062117 | A1* | 3/2015 | Reitmayr ...................... 345/419 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Dwayne Bost
*Assistant Examiner* — Christopher Kohlman
(74) *Attorney, Agent, or Firm* — Lee & Hayes, PLLC

(57) ABSTRACT

A system may utilize a projector, a camera, and a depth sensor to produce images within the environment of a user and to detect and respond to user actions. Depth data from the depth sensor may be analyzed to detect and identify items within the environment. A coordinate transformation may then be used to identify corresponding color values from camera data, which can in turn be analyzed to determine the colors of detected items. A similar coordinate transformation may be used to identify color values of a projected image that correspond to the detected items. In some cases, camera color values corresponding to an item may be corrected based on the corresponding color values of a projected image. In other cases, projected color values corresponding to an item may be corrected based on the corresponding camera color values.

20 Claims, 5 Drawing Sheets

OBJECT-BASED COLOR DETECTION AND CORRECTION

BACKGROUND

As computing devices evolve, the ways in which users interact with these devices also continue to evolve. In the past, people have interacted with computing devices primarily through mechanical devices (e.g., keyboards, mice, etc.), electrical devices (e.g., touch screens, touch pads, etc). In the future, people may interact with computing devices in more natural ways such as by speech, gestures, and physical interactions with surfaces or objects of an environment.

Certain systems may monitor physical characteristics of a room and the users within the room in order to implement user interactions. For example, various sensors may be used to detect and identify surfaces of the room, objects within the room, positions of users within the room, gestures of the users, and interactions by the user in relation to items, objects, or surfaces. Such systems may perform actions that may be based in part on characteristics, such as color, of items within a user environment and with which a user interacts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
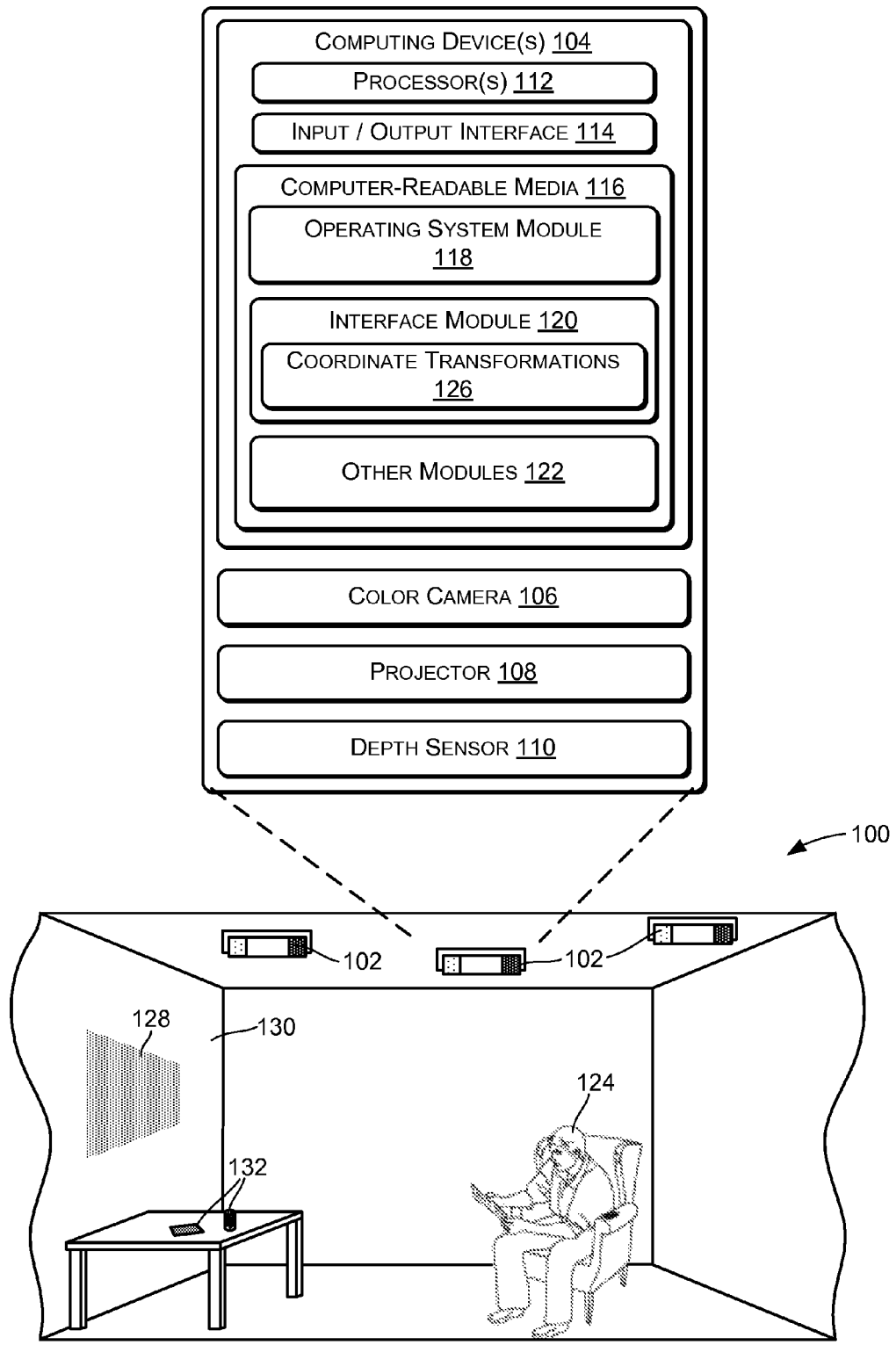
FIG. 1 illustrates an environment that includes an augmented reality functional node (ARFN) configured to identify and track objects within an environment.

Described herein are systems, devices, and techniques for determining physical properties of a room or other environment, of objects or surfaces within the room, and of users within the room. The system analyzes three-dimensional properties of the room to detect the locations of walls, furniture, users, and objects, while also determining the colors of such items. The system may also monitor the positions and movements of a user within the room and may detect interactions by the user with various items, including objects and surfaces.

Objects within the environment may be used as tools that may be moved or manipulated by the user to initiate system functions. Such tools may be used in conjunction with displayed content and/or in conjunction with other objects or surfaces of the room. As an example, the system may project an image onto a wall and the user may use the object as a virtual tool to draw upon the image. In this example, the system may be configured to detect the object and its location relative to the wall. When the object is placed near the wall, the system may simulate drawing on the wall by projecting a line corresponding to the path of the object over the wall.

In a described implementation, a system may utilize a depth sensor to observe a physical scene. Such a scene may comprise a room or a portion of a room, and may include various items such as walls and other objects that are within the room. The items have surfaces that are observed by the depth sensor.

The depth sensor produces a depth image of the scene, which may be analyzed to determine shapes and locations of the items within the scene. The depth image indicates three-dimensional coordinates of multiple points of the surfaces of the items within the scene. The surface points are analyzed using shape and object detection techniques to identify room characteristics as well as positions and characteristics of other items within the room.

The system may also utilize a color camera that produces camera images of the scene. Each camera image comprises camera pixels or color values corresponding respectively to two-dimensional camera coordinates.

The depth camera and the color camera may be mounted together in a fixed positional relationship. Based on known optical and positional characteristics of the two devices, the depth camera and the color camera may be calibrated to determine a coordinate transformation between the three-dimensional coordinates of the surface points of the scene and the two-dimensional camera coordinates.

Upon detecting an item within the environment based on analysis of one or more depth images, the surface points of the item and their corresponding three-dimensional coordinates are identified. The coordinate transformation described above is then applied to the three-dimensional coordinates of the surface points of the item in order to find the corresponding color values of the camera images. This allows the system to both identify an object and to determine its color.

In certain embodiments, the system may also utilize a projector that projects display images onto a surface. Each display image comprises projector pixels or color values corresponding respectively to two-dimensional projector coordinates.

The projector may be mounted in a fixed relationship with the depth sensor and the color camera. Based on known optical and positional characteristics of the depth camera and the projector, the depth camera and the projector are calibrated to determine a coordinate transformation between the three-dimensional coordinates of the surface points of a detected item and the two-dimensional projector coordinates. This transformation allows the system to identify a corresponding projector color value for each surface point of the detected item.

More generally, coordinate transformations may be used to convert or map between the three-dimensional coordinates of the depth sensor, the two-dimensional coordinate system of the color camera, and the two-dimensional coordinate system of the projector.

Coordinate transformations may be used for various purposes. As in the example described above, an item may be detected in three-dimensional space by analyzing the depth images of the depth camera. Once an item has been detected, coordinates of the surface points of the item may be used in combination with an appropriate coordinate transformation to determine corresponding color values from the camera color images in order to determine the color of the item. Subsequent actions by the system may depend on the color of the item. For example, the system may be configured to use the item as a drawing tool and to draw on a surface in a color that corresponds to the color of the item.

Coordinate transformation may also be used for other purposes. For example, the system may identify a display surface upon which an image, such as a user interface, is to be projected. The three-dimensional coordinates of the surface may be determined by analyzing the depth images produced by the depth camera. Subsequently, corresponding color values of the camera images may be found and analyzed to determine the color of the surface. In addition, two-dimensional projector coordinates corresponding to the display surface may be identified so that the projector may be configured to project the image upon the display surface. Furthermore, the color values used by the projector may be adjusted or corrected to account for the color of the display surface, so that projected colors will be perceived by the user as intended by the system despite non-white projection surfaces.

As another example, the system may attempt to determine the color of a detected item. In some cases, an image projected by the projector may affect the apparent color of the item as seen by the user and detected by the color camera. Using coordinate transformations, the color values projected onto the item may be determined and used to correct the corresponding color values of the color camera in order to determine the original color of the item despite an altered apparent color.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment 100 illustrates three nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104 as well as various actuators, output devices, and sensors. As will be described in more detail below, actuators may include motors for moving the ARFN 102 as well as for focusing, rotating, panning, and zooming optical elements of the ARFN 102. Output devices of the ARFN 102 may include indicators, projectors, speakers, displays, etc. Sensors may include cameras (e.g., motion and/or still cameras), Time-of-Flight (ToF) sensors, audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof.

For purposes of the present discussion, the ARFN 102 is illustrated as having a color camera 106, a projector 108, and a depth sensor 110, although many implementations may include various other types of output devices and/or sensors.

The color camera 106 may comprise a digital, electronic camera that captures and produces two-dimensional images, referred to herein as camera images. Each camera image comprises a plurality of pixels or color values corresponding to a two-dimensional grid of an imaged scene. Each camera color value corresponds to one of multiple two-dimensional camera coordinates, and each color value specifies the observed color of a corresponding surface point within the scene. Each color value may comprise a set of values, such as a value for each of the red, green, and blue components of the corresponding image pixel. Various formats may be used to represent camera color values.

The projector 108 may similarly comprise a digital, electronic projector that receives and projects two-dimensional images, referred to herein as projector images. Each projector image comprises a plurality of pixels or color values corresponding to a two-dimensional grid. Each projector color value corresponds to one of multiple two-dimensional projector coordinates, and each projector color value specifies the intended color of a corresponding two-dimensional area or spot within the scene. Each projector color value may comprise a set of values, such as a value for each of the red, green, and blue components of the corresponding image pixel. Various formats may be used to represent projector color values.

The depth sensor 110 may comprise one of various types of sensors, range cameras, or other systems that may be used to observe and evaluate three-dimensional properties of a scene. For example, the depth sensor 110 may utilize time-of-flight measurements to determine distances of observed surface points within the scene. In certain implementations, for example, the depth sensor 110 may transmit non-visible light such as infrared light and may monitor reflections of the transmitted light to determine the path lengths of the light as it travels from the sensor, to different surface points, and back to the sensor.

In the described example, the depth sensor 110 produces depth images. Each depth image indicates three-dimensional coordinates of one of multiple surface points of a scene. The depth images may in some situations be referred to as point clouds, because each depth image specifies multiple points in relation to a three-dimensional coordinate system.

Different types of distance or depth sensing may be used in various embodiments. For example, lidar is a technology that uses laser illumination and time-of-flight observations to determine distances to objects or surfaces. Structured light techniques may also be used to determine surface depths. Structured light comprises a geometric pattern that is projected onto the surfaces of a scene. For example, multiple parallel lines may be projected onto the scene. When viewed from the same perspective as the projector, the lines appear straight. When viewed from other perspectives, however, the lines are curved due to irregular surface shapes. By placing a camera at an offset from the projector, these curves may be observed and analyzed to detect the distances of surface points from the projector and/or camera.

The computing device 104 of the example ARFN 102 may include one or more processors 112, an input/output interface 114, and memory or computer-readable media 116. The processors 112 may be configured to execute instructions or instruction modules, which may be stored in the computer-readable media 116 or in other computer-readable media accessible to the processors 112.

The input/output interface 114 may be configured to couple the computing device 104 to other components of the ARFN 102, such as the color camera 106, the projector 108, the depth sensor 110, other output and input devices, other ARFNs 102, other computing devices, and so forth.

The computer-readable media 116 may include non-transitory computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 116 may reside within a housing of the ARFN 102, on one or more storage devices accessible on a local network, on cloud storage accessible via a wide area network, or in any other accessible location.

The computer-readable media 116 may store executable components, programs, routines, modules, etc., such as instructions, datastores, and so forth that are configured to execute on the processors 112. For instance, the computer-readable media 116 may store an operating system module 118, an interface module 120, and other modules 122.

The operating system module 118 may be configured to manage hardware and services within and coupled to the computing device 104 for the benefit of other modules. The interface module 120 may be configured to receive, interpret, and respond to commands received from users within the environment 100. For instance, the interface module 120 may analyze various input captured by components of the ARFN 102 to identify one or more hands of a user 124. In response to recognizing a hand and identifying a gesture formed by the hand, the interface module 120 may interpret the gesture and cause the ARFN 102 to perform a corresponding action. For instance, if the user 124 makes a gesture requesting that the ARFN 102 project a certain piece of content, the interface module 120 may interpret the gesture and cause the projector 108 to project the content.

The interface module 120 may calculate or access one or more coordinate transformations 126 to correlate or map between surface points detected by the depth sensor 110, pixels or color values of the projector 108, and pixels or color values of the color camera 106. The color camera 106 and the projector 108 operate with respect to data that is specified in relation to respective two-dimensional coordinate systems. The depth sensor 110, on the other hand, operates with respect to data that is specified in relation to a three-dimensional coordinate system. The coordinate transformations 126 allow data in the various images and coordinate systems to be correlated with each other, so that data representing a particular surface or point of an environment may be located in each of the depth images, camera images, and projector images.

In operation, the ARFN 102 and its components may project a user interface in the form of an image. For example, the ARFN 102 may project a user interface image 128 on a planar surface such as a wall 130. The user 124 may select a control that is displayed as part of the image 128 or may otherwise point or gesture in relation to the image 128. In response, the ARFN 102 may provide feedback to the user 124 and/or may cause performance of actions corresponding to the selection by the user 124. For instance, the ARFN 102 might project a remote control and provide feedback to the user 124 indicating which button(s) the user is in position to select, may identify a particular selection by the user 124 (e.g., a selection to power on a television) and may operate a television according to the identified selection.

The ARFN 102 may also be configured to detect and track the positions of various objects or items 132 within the user environment. The ARFN 102 may react when a user picks up touches certain items. The ARFN 102 may be configured to recognize certain of the items 132 as tools for use by the user 124 when interacting with the ARFN 102.

Generally, the ARFN 102 may be configured to project various types of images on surfaces or objects within the environment and to detect user input that is performed in relation to the images. Moreover, the projected images may comprise dynamic content that changes depending on user behavior. By tracking the positions of a user's hands, fingers, arms, face, etc. over time, the ARFN 102 may detect gestures of the user 124. Such gestures may be interpreted as instructions or commands to be implemented by the ARFNs 102.

As an example, the ARFN may implement a drawing application that allows the user to draw images or notes onto a virtual drawing pad. Initially, the ARFN may project an image of a blank area and some associated controls onto a suitable object or display surface. The user may point at, touch, or otherwise select from among the controls to command certain operations or modes. As a further example, the user may utilize a virtual drawing tool resembling a marker or pen, which may be formed by one of the items 132 within the environment. The ARFN 102 may detect that the user 124 is holding and moving the drawing tool over the display surface, and may dynamically change the projected image 128 to emulate a line of virtual ink that is being applied by the drawing tool. In this example, the user 124 may select a virtual ink color by touching or pointing to one of a plurality of example colors shown on a menu of the displayed image 128. Alternatively, the ARFN 102 may be configured to detect the color of the drawing tool and to select a virtual ink color corresponding to the color of the drawing tool.

The user may interact in many different ways with the ARFN 102, though the use of objects, motions, gestures, voice commands, and so forth. Furthermore, the ARFN may detect other activities of the user and may change its behavior depending on the state or activity of the user. Similarly, the ARFN 102 may detect various items within the environment and may make various commands available to the user based on the presence of such items. For example, the ARFN may identify suitable display surfaces or objects upon which images may be projected, and the user may be able through gestures to indicate where the images should be projected or displayed. The images may represent various type of content, including electronic books, videos, pictures, interactive menus and controls, or any other sort of visual content.

Figure 2:
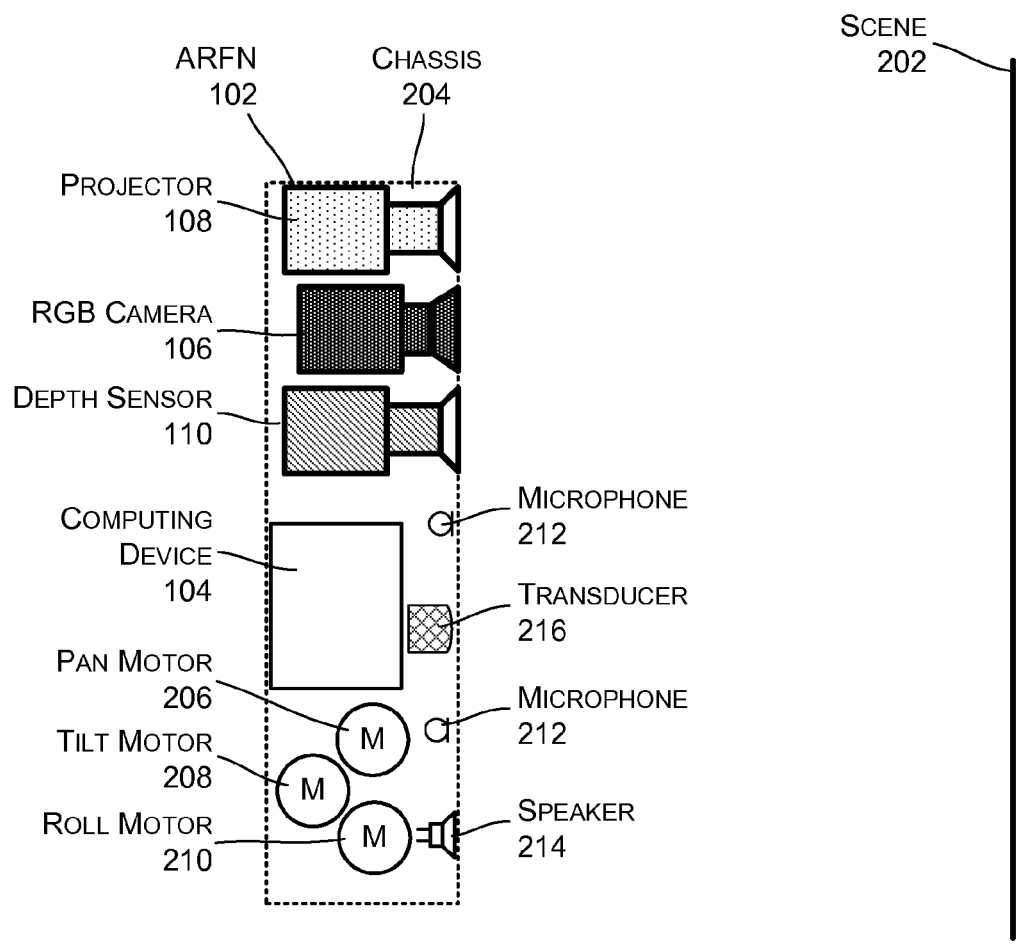
FIG. 2 illustrates components of an example ARFN.

FIG. 2 shows additional details of an example ARFN 102. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth, within the environment or on surfaces within the scene 202.

A chassis 204 holds the components of the ARFN 102. One or more projectors 108 may be disposed within the chassis 204 and may be configured to generate and project display images onto surfaces within the scene 202. The projector 108 may be implemented with any number of technologies capable of generating or receiving a display image and projecting that image onto a surface within the scene 202. Suitable technologies include a digital micromirror device (DMD), liquid crystal on silicon display (LCOS), liquid crystal display, 3LCD, and so forth. The projector 108 may have variable zoom and focus capabilities. Note that although the scene 202 is represented as a planar surface, it may alternatively be defined by an irregular surface and may be defined in part by various objects within a user environment.

One or more cameras 106 may also be disposed within the chassis 204. The cameras 106 are configured to image the scene 202 in visible light wavelengths, non-visible light wavelengths, or both. The cameras 106 may have variable zoom and focus capabilities.

One or more depth sensors 110 may also be disposed within the chassis 204. As an example, the depth sensor 110 may comprise a time-of-flight camera or other range camera for sensing three-dimensional (3D) characteristics of objects within the scene 202. Range cameras may use various technologies to determine distances to surface points of a scene. In embodiments described herein, the depth sensor 220 uses time-of-flight techniques to determine distances. Time-of-flight techniques utilize a signal that is radiated from the sensor and reflected from one or more surface points of the scene. In the described embodiments, the signal comprises a non-visible light signal, although other types of signals may also be used. For example, LIDAR technology utilizes reflected RF signals to determine distances to objects or surface points.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 108 and/or the camera 106. For example, in one implementation the actuator may comprise a pan motor 206, a tilt motor 208, a roll motor 210, and so forth. The pan motor 206 is configured to rotate the chassis 204 in a yawing motion. The tilt motor 208 is configured to change the pitch of the chassis 204. The roll motor 210 is configured to move the chassis 204 in a rolling motion. By panning, tilting, and/or rolling the chassis 204, different views of the scene 202 or different scenes within the environment 100 may be acquired.

One or more microphones 212 may be disposed within the chassis 204, or elsewhere within the environment 100. The microphones 212 may be used to acquire input from a user, may to determine the location of a sound, or to otherwise aid in the characterization and receipt of input from the user environment. For example, the user may make a particular noise, such as a tap on a wall or a snap of the fingers, which is pre-designated as an attention command input. The user may alternatively use voice commands. Such audio inputs may be located using time-of-arrival differences among the microphones 212 in order to determine positions of users.

One or more speakers 214 may also be present to provide for audible output. For example, the speakers 214 may be used to provide output from a text-to-speech module or to playback pre-recorded audio.

A transducer 216 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In FIG. 2, the computing device 104 is shown within the chassis 204. In other implementations, however, all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

In other implementations, the components of the ARFN 102 may be distributed in one or more locations within the scene 202. As mentioned above, the microphones 212 and speakers 214 may be distributed throughout the environment that includes the ARFN 102. The projector 108, the camera 106, and the depth sensor 110 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
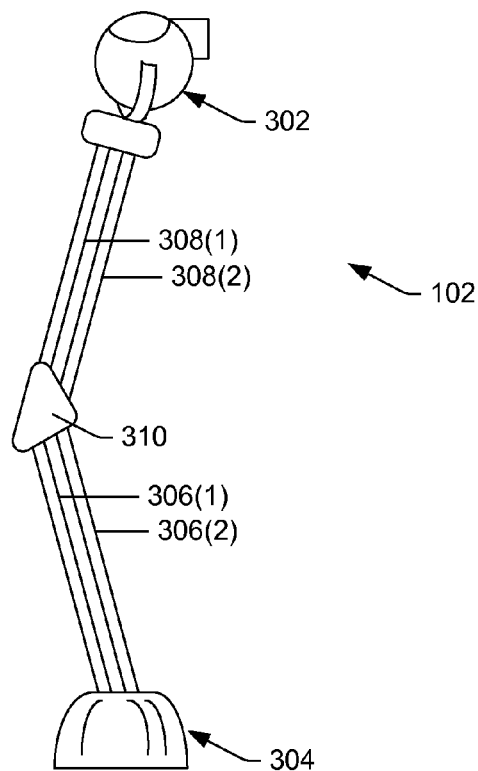
FIG. 3 illustrates an alternative configuration of an ARFN.

FIG. 3 shows an example of an ARFN 102 that resembles a table lamp. In this example, the ARFN 102 has a head 302 attached to a base 304 by a movable arm mechanism. The arm mechanism has two base members or rods 306(1) and 306(2) connected to two head members or rods 308(1) and 308(2) via a joint connector 310.

The ARFN 102 may contain any of the components shown in FIG. 3 as well as other components that may be used to control and/or monitor movement of the head 302 relative to the base 304. The head 302 may contain the projector 108, the camera 106, and the depth sensor 110, for example. The base 304 may contain components such as power components, operating logic, sensor interfaces, actuator interfaces, and so forth. Generally, the components shown in FIG. 2 may be located in either the head 302 or the base 304 of the device 102.

Figure 4:
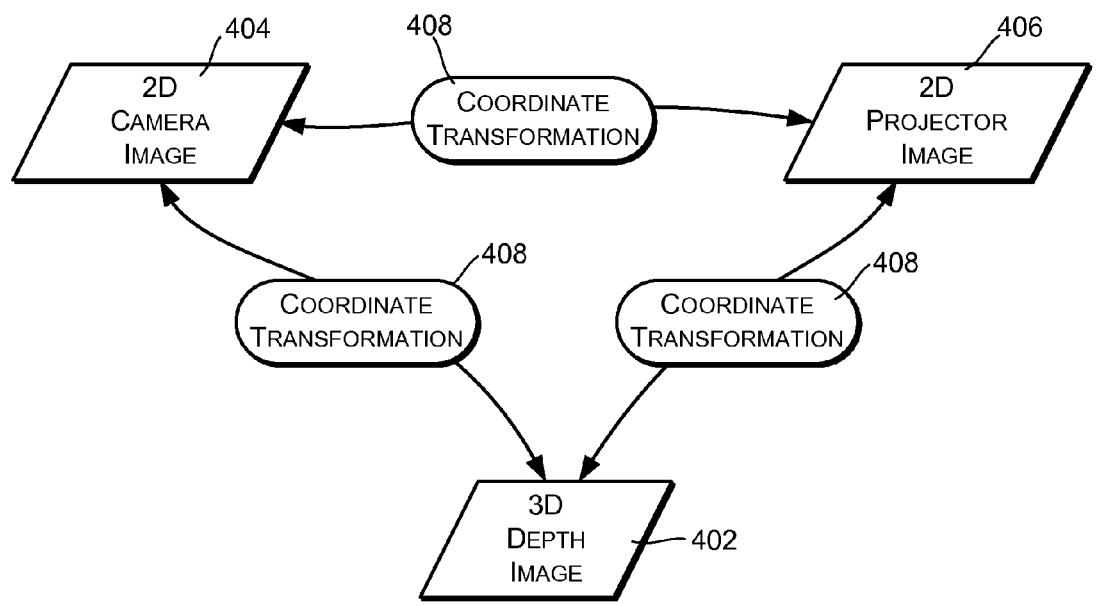
FIG. 4 illustrates logical relationships of various data images and transformations that may be used in conjunction with a system such as an ARFN.

FIG. 4 illustrates coordinate transformations between the data images used by the color camera 106, the projector 108, and the depth sensor 110. A three-dimensional depth image 402 contains data indicating detected surface points of the environment 100, specified relative to a three-dimensional coordinate system. More specifically, the three-dimensional depth image 402 comprises three-dimensional coordinates produced by the depth sensor 110. The position of each surface point is specified as a set of x, y, and z coordinates.

In this example, the three-dimensional coordinate system of the depth sensor 110 is used as a reference coordinate system. Such a reference coordinate system may sometimes be referred to as a world coordinate system, and different world coordinate systems may be used in different embodiments.

The color camera produces a two-dimensional camera image 404, comprising a plurality of pixel or color values specified in relation to a two-dimensional coordinate system of the color camera 106. That is, the position of each camera color value is specified in x and y coordinates, without a z or depth coordinate or with an assumed constant depth coordinate z.

The projector receives and projects a two-dimensional projector image 406, comprising a plurality of pixel or color values specified in a two-dimensional coordinate system of the projector. That is, the position of each projector color value is specified in x and y coordinates, without a z or depth coordinate or with an assumed constant depth coordinate z.

One or more coordinate transformations 408 are used to map between the surface points and color values of the three-dimensional depth image 402, the two-dimensional camera image 404, and the two-dimensional projector image 406. As illustrated, an example system may utilize transformations to convert directly between any pair of device coordinates systems. Alternatively, transformation may convert the coordinate systems of each device to a common world coordinate system. The coordinate transformations are based at least in part on intrinsic parameters of the depth sensor 110, color camera 106, and projector 108, as well as extrinsic parameters between the depth sensor 110, color camera 106, and projector 108.

A coordinate transformation is a function that accepts a coordinate vector of one coordinate system and yields a corresponding coordinate vector in another coordinate system. A three-dimensional to two-dimensional coordinate transformation may be represented as follows:

$$[x_a, y_a, 1]^{-1} = A[RT][x_b, y_b, z_b, 1]^{-1}$$

where
- $[x_a, y_a]$ is a coordinate in a two-dimensional coordinate system;
- $[x_b, y_b, z_b]$ is a coordinate in a three-dimensional coordinate system;
- R is a 3×3 orthogonal rotation matrix;
- T is a 3*1 translation matrix; and
- A is a 3×3 matrix, referred to as an intrinsic matrix, containing intrinsic parameters relating to focal length, image format, principal point, scaling factors, and skew coefficients of the imaging elements that operate in the respective coordinate systems.

The matrices R, T, and A are determined based on positional and orientational relationships of and between the imaging elements that operate in the respective coordinate systems, such as the depth sensor 110, the camera 106, and the projector 108. The R and T matrices are referred to as extrinsic matrices, having extrinsic calibration parameters. The elements of the intrinsic A matrix are referred to as intrinsic calibration parameters.

By using the appropriate coordinate transformation, any surface point defined by the three-dimensional depth image 402 can be mapped to a corresponding color value in either the two-dimensional camera image 404 or the two-dimensional projector image 406.

A three-dimensional to three-dimensional coordinate transformation may be defined as follows:

$$[x_a, y_a, z_a]^{-1} = R[x_b, y_b, z_b]^{-1} + T$$

where
- $[x_a, y_a, z_a]$ is a coordinate in first three-dimensional coordinate system;
- $[x_b, y_b, z_b]$ is a coordinate in a second three-dimensional coordinate system;
- R is a 3×3 orthogonal rotation matrix; and
- T is a 3*1 translation matrix.

A two-dimensional to two-dimensional coordinate transformation may be defined as follows:

$$[x_a, y_a]^{-1} = [x_b, y_b]^{-1} + T$$

where
- $[x_a, y_a]$ is a coordinate in first two-dimensional coordinate system;
- $[x_b, y_b]$ is a coordinate in a second two-dimensional coordinate system;
- T is a 2*1 translation matrix.

Figure 5:
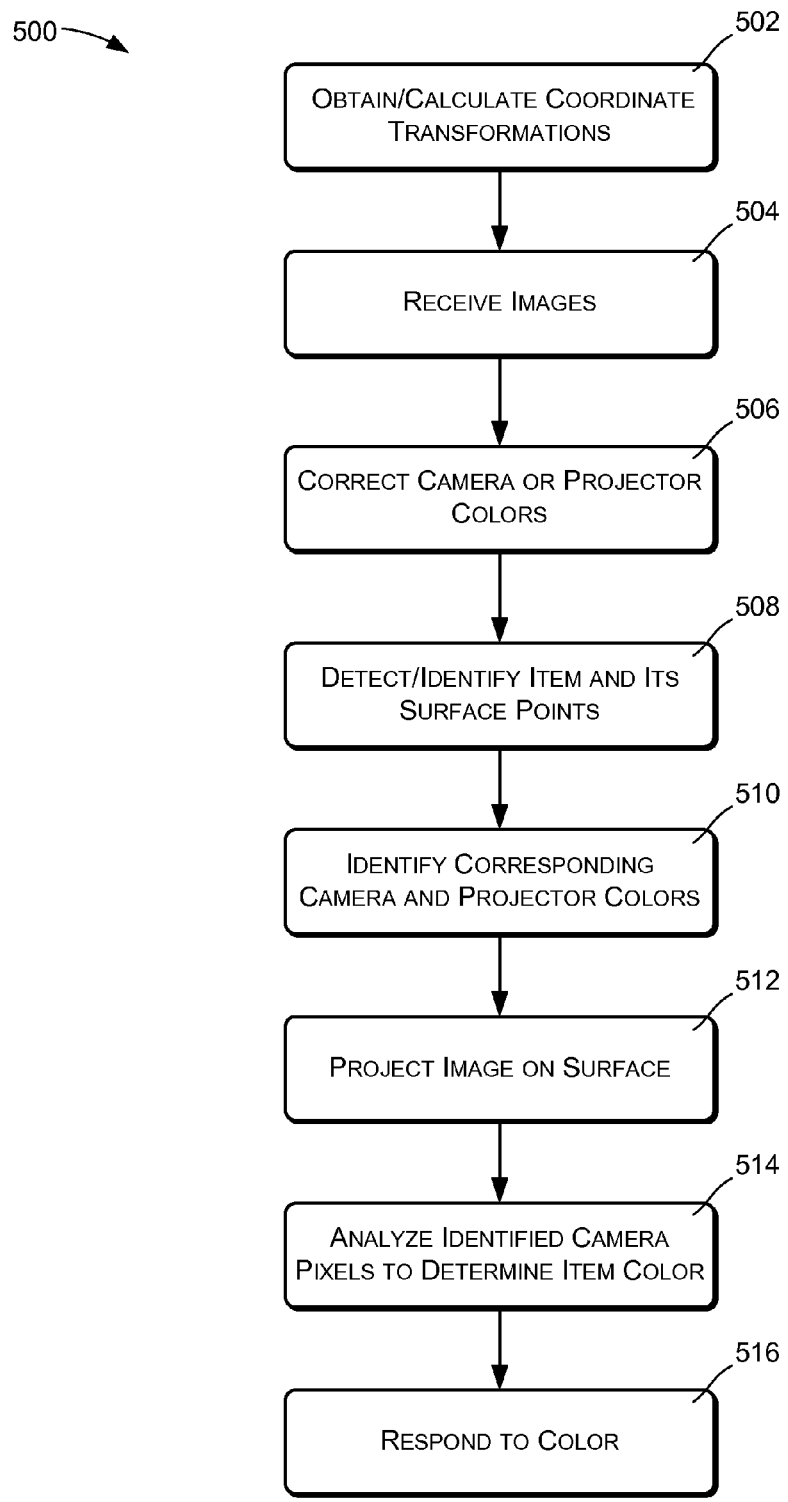
FIG. 5 is a flow diagram illustrating an example process that may be performed by an ARFN or other system to detect and/or correct colors in a system such as an ARFN.

FIG. 5 illustrates an example method 500 that may be performed to detect and/or correct colors and color values used in systems such as discussed above. An action 502 comprises obtaining or calculating one or more coordinate transformations that convert between coordinate systems of two or more system devices such as cameras, projectors, and/or depth sensors. The coordinate systems may be of different dimensions. In the embodiments described above, a depth sensor uses a three-dimensional coordinate system while a camera and a projector use two-dimensional coordinate systems.

An action 504 comprises receiving images from system devices, such as depth images, camera images, and projector images. The images may include a depth image received from a depth sensor, where the depth image indicates three-dimensional coordinates for each of multiple surface points of a scene. The images may include a camera image received from a camera, where the camera image comprises a camera color value for each of multiple two-dimensional camera coordinates. Each camera color value indicates the apparent color of a corresponding pixel of a scene. The images may include a projector image received from a source for projection by a projector, where the projector image comprises a projector color value for each of multiple two-dimensional projector coordinates. Each projector color value indicates the projected color of a pixel.

An action 506, performed in some embodiments, may comprise adjusting, calibrating, or correcting either the camera color values or the projector color values. For example, the camera color values may be corrected to account for colors introduced by the projector. Alternatively, the projector color values may be corrected to account for non-white surfaces upon which images are projected. Example methods of such adjusting or correcting will be discussed in more detail below, with reference to FIGS. 6 and 7.

An action 508 comprises analyzing the depth image received in the action 504 to detect the presence of an item within a scene and to identify a set of the surface points indicated by the depth image that are formed by the detected item. In some cases, the item may correspond to a surface such as a wall or tabletop that is to be used as a display surface for user content. In other cases, the item may comprise an object within a room of the environment, such as an article of furniture. The item may also comprise an object that is used as a tool by a user in conjunction with a user interface that may be projected upon a surface of the environment.

An action 510 comprises identifying a set of the camera color values that correspond to the detected item, based at least in part on the set of surface points formed by the detected item and one or more of the coordinate transformations obtained in the action 502. More specifically, the action 510 may comprise (a) applying a coordinate transformation to the coordinate of each surface point formed by the detected item to identify a corresponding two-dimensional camera coordinate and (b) referencing the camera image to find the color value at that camera coordinate.

The action 510 may also comprise identifying a set of the projector pixels or color values that correspond to the detected item—those color values that are being projected onto the detected item. Identifying these pixels or color values may be based at least in part on the set of surface points formed by the detected item and one or more of the coordinate transformations obtained in the action 502. More specifically, the action 510 may comprise (a) applying a coordinate transformation to the coordinate of each surface point formed by the detected item to identify a corresponding two-dimensional projector coordinate and (b) referencing the projector display image to obtain the projector color value at that camera coordinate.

An action 512 comprises projecting the display image into a user environment or onto a scene or portion of a scene within the user environment. In some cases, the action 512 may comprise projecting an image onto the item detected in the action 508. In some cases, the image or a sequence of images may be used to form or implement a user interface, with which the user may interact to command the system. As a more specific example, the item detected in the action 508 may comprise a display surface and the action 512 may project a user interface image or other image onto the display surface.

An action 514 comprises analyzing the identified set of camera color values, corresponding to recognized surface points of the detected item, to determine a color of the item. This may comprise averaging or otherwise combining the individual color values corresponding to the surface points of the detected item to determine a predominant color exhibited by the surface points of the item.

An action 516 comprises responding to the determined color of the item. With reference to one of the examples above, the item may comprise a virtual drawing tool, and the system may respond by setting the virtual ink color of the drawing tool to the same as the actual color of the item.

Figure 6:
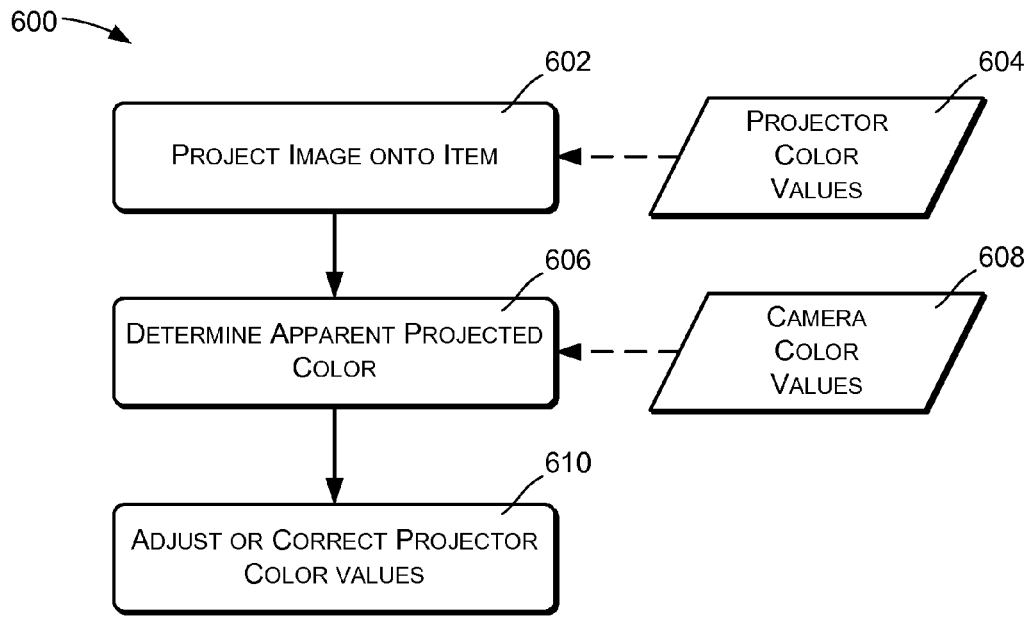
FIG. 6 is a flow diagram illustrating an example process that may be performed in order to correct projector color values.

FIG. 6 illustrates an example method 600 of correcting projector color values based on colors observed by a camera, corresponding in one embodiment to the action 506 of FIG. 5. The method 600 may be performed in some implementations in order to correct for any background hue or tint introduced by the color of the detected item itself.

An action 602 may comprise projecting an image onto a detected item, which may occur as part of the action 512 (FIG. 5). The projected image is based on projector color values 604 as described above, which represent intended image colors relative to a white or neutral background.

An action 606 may comprise determining the apparent color of the image projected onto the item based on camera color values 608. The apparent color may differ from the projected or intended color in cases where the item has a non-neutral or non-white color.

An action 610 comprises adjusting or correcting the projector color values so that the apparent color projected onto the item is the same as the intended color. For example, a transfer function may define the camera color value that should result from any given projector color value. If the camera color values corresponding to the object are not as expected, the corresponding projector color values may be adjusted until the camera color values are as expected.

Figure 7:
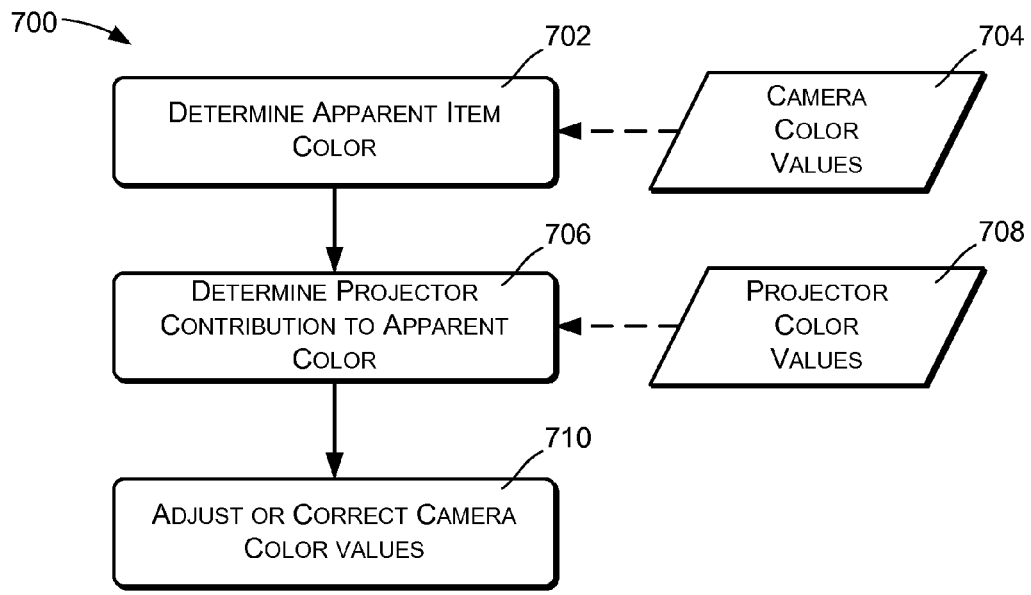
FIG. 7 is a flow diagram illustrating an example process that may be performed in order to correct camera color values.

FIG. 7 illustrates an example method 700 of correcting camera color values based on the color values projected by a projector, corresponding to the action 506 of FIG. 5. The method 600 may be performed in some implementations in order to determine an actual color of a detected item despite a hue or tint that has been introduced by the projection of an image onto the item by the system projector.

An action 702 may comprise determining an apparent color of the detected item based at least in part on camera color values 704. An action 706 may comprise determining a contribution to the apparent color by the projection of the projector color values 708. An action 710 may comprise adjusting or correcting the camera color values based on the contribution by the projector color values 708. For example, a transfer function may indicate the impact of any given projected color on the apparent or evaluated color of an object. When the projector is projecting a color upon an item, the colors projected onto the item may be used to correct any color values indicated by the system camera that correspond to the item.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
    a depth sensor configured to produce a depth image of a scene, the scene containing one or more surfaces, wherein the depth image indicates three-dimensional coordinates for the one or more surfaces;
    a color camera configured to produce a camera image of the scene, the camera image comprising a camera color value for an individual one of two-dimensional camera coordinates;
    a projector configured to project a display image onto the scene, the display image comprising a projector color value for an individual one of two-dimensional projector coordinates; and
    operating logic configured to perform acts comprising:
        obtaining coordinate transformations between the three-dimensional coordinates, the two-dimensional camera coordinates, and the two-dimensional projector coordinates;
        analyzing the depth image to detect an item within the scene and to identify a set of the surface points that are formed by the detected item;
        identifying a set of camera color values that correspond to the item based at least in part on the three-dimensional coordinates of surface points of the set of surface points and one or more of the coordinate transformations;
        analyzing the set of camera color values to determine a color of the item; and
        identifying a set of the projector color values that correspond to the item based at least in part on the three-dimensional coordinates of the surface points of the set of surface points and one or more of the coordinate transformations.

2. The system of claim 1, the acts further comprising correcting the set of projector color values based at least in part on the set of camera color values.

3. The system of claim 1, the acts further comprising correcting the set of camera color values based at least in part on the set of projector color values.

4. The system of claim 1, wherein the item comprises a display surface and the display image implement a user interface on the display surface.

5. A system comprising:
    a depth sensor configured to produce a depth image of a scene, the depth image comprising three-dimensional coordinates for one or more surfaces of the scene;
    a color camera configured to produce a camera image of the scene, the camera image comprising a camera color value for an individual one of two-dimensional camera coordinates;
    a projector configured to project an image onto the scene, the image comprising a projector color value for an individual one of two-dimensional projector coordinates;
    operating logic configured to perform acts comprising:
        obtaining coordinate transformations between the three-dimensional coordinates, the two-dimensional camera coordinates, and the two-dimensional projector coordinates;
        analyzing the depth image to identify a set of the surface points of an item within the scene;
        applying one or more of the coordinate transformations to the three-dimensional coordinates of surface points of the set of surface points to identify a set of the camera color values that correspond to the item; and
        analyzing the set of camera color values to determine a color of the item.

6. The system of claim 5,
    wherein the acts further comprise:
        applying one or more of the coordinate transformations to the three-dimensional coordinates of the surface points of the set of surface points to identify a set of the projector color values that correspond to the item; and
        correcting the set of projector color values based at least in part on the set of camera color values.

7. The system of claim 5,
wherein the acts further comprise:
applying one or more of the coordinate transformations to the three-dimensional coordinates of the surface points of the set of surface points to identify a set of the projector color values that correspond to the item; and
correcting the set of camera color values based at least in part on the set of projector color values.

8. The system of claim 5, wherein at least one of the coordinate transformations is a function of intrinsic parameters of the depth sensor and color camera and extrinsic calibration parameters between the depth sensor and the color camera.

9. The system of claim 5, wherein the intrinsic parameters comprise one or more of:
focal lengths,
image formats,
principal points,
scaling factors, and
skew coefficients.

10. The system of claim 5, wherein the extrinsic parameters define relative positions and orientations of the depth sensor and the color camera.

11. The system of claim 5, wherein the item comprises a display surface, the acts further comprising:
projecting a user interface onto the display surface; and
color correcting the projected user interface based at least in part on the determined color of the display surface.

12. The system of claim 5, wherein the item comprises a tool for interacting with a user interface displayed on a display surface.

13. A method, comprising:
receiving a depth image of a scene, the depth image a comprising three-dimensional coordinates for one or more surfaces of the scene;
receiving a color image of the scene, the color image comprising a camera color value for an individual one of two-dimensional camera coordinates;
receiving two-dimensional coordinates associated with a display image projected onto the scene, the display image comprising a projector color value for an individual one of two-dimensional projector coordinates;
analyzing the depth image to identify a set of surface points of an item within the scene;
obtaining coordinate transformations between the three-dimensional coordinates, the two-dimensional camera coordinates, and the two-dimensional projector coordinates;
identifying a set of the camera color values that correspond to the item based at least in part on the identified set of surface points and one or more of the coordinate transformations; and
determining a color of the item based at least in part on the identified set of camera color values.

14. The method of claim 13, further comprising:
projecting the display image onto the scene; and
identifying a set of the projector color values that correspond to the item based at least in part on the identified set of surface points and one or more of the coordinate transformations.

15. The method of claim 13, wherein the item comprises a display surface, the method further comprising:
projecting a user interface onto the display surface, wherein the user interface comprises projector color values; and
color correcting the projector color values of the user interface based at least in part on the determined color of the display surface.

16. The method of claim 13, wherein the item comprises a display surface, the method further comprising:
projecting a display image onto the display surface, wherein the display image comprises projector color values; and
color correcting the identified set of the camera color values based at least in part on the projector color values.

17. The method of claim 13, wherein the item comprises a drawing tool for interacting with a user interface displayed on a display surface.

18. The method of claim 13, wherein one of the coordinate transformations is a function of intrinsic parameters of a depth sensor and a color camera and extrinsic calibration parameters between the depth sensor and the color camera.

19. The method of claim 13, wherein the intrinsic parameters comprise one or more of:
focal lengths,
image formats,
principal points,
scaling factors, and
skew coefficients.

20. The method of claim 13, wherein the extrinsic parameters define relative positions and orientations of the depth sensor and the color camera.

* * * * *